US010927485B2

(12) United States Patent
Huang et al.

(10) Patent No.: US 10,927,485 B2
(45) Date of Patent: Feb. 23, 2021

(54) SHOEMAKING MACHINE HAVING ULTRASONIC POSITIONING FUNCTION

(71) Applicant: POU CHEN CORPORATION, Chang Hwa Hsien (TW)

(72) Inventors: Hsien-Tang Huang, Tainan (TW); Sheng-Yen Tseng, Nantou (TW); Meng-Chieh Tsai, Kaohsiung (TW); Jen-Hsiu Tsai, Taichung (TW)

(73) Assignee: POU CHEN CORPORATION, Chang Hwa Hsien (TW)

( * ) Notice: Subject to any disclaimer, the term of this patent is extended or adjusted under 35 U.S.C. 154(b) by 2 days.

(21) Appl. No.: 16/423,598

(22) Filed: May 28, 2019

(65) Prior Publication Data

US 2019/0376218 A1  Dec. 12, 2019

(30) Foreign Application Priority Data

Jun. 11, 2018 (TW) .................................. 10720779.3
Feb. 1, 2019 (TW) .................................. 10810405.6

(51) Int. Cl.
*D05B 35/04* (2006.01)
*A43D 11/00* (2006.01)
(Continued)

(52) U.S. Cl.
CPC .............. *D05B 35/04* (2013.01); *A43D 11/00* (2013.01); *D05B 17/00* (2013.01); *D05B 19/12* (2013.01)

(58) Field of Classification Search
CPC ....... D05B 15/02–15/10; D05B 23/006; D05B 31/00; D05B 31/02; D05B 35/04; D05B 17/00
See application file for complete search history.

(56) References Cited

U.S. PATENT DOCUMENTS 8,061,286 B2 * 11/2011 Hirata ...................... D05C 5/04
112/470.01
9,133,572 B2 * 9/2015 Nishimura ............. D05B 19/12
(Continued)

FOREIGN PATENT DOCUMENTS

JP S63125291 A 5/1988
JP H05305193 A 11/1993
(Continued)

OTHER PUBLICATIONS

Search Report appended to an Office Action, which was issued to Taiwanese counterpart application No. 108104056 by the TIPO dated Dec. 24, 2019, with an English translation thereof.
(Continued)

*Primary Examiner* — Danny Worrell
(74) *Attorney, Agent, or Firm* — Banner & Witcoff, Ltd.

(57) ABSTRACT

A shoemaking machine includes a sewing device having a cantilever unit, a work platform and a clamping frame unit. The cantilever unit has a sewing needle extending toward the clamping frame unit. A driving device is disposed on the cantilever unit, and includes a movable seat that is movable toward and away from the clamping frame unit. An ultrasonic positioning device is connected to the cantilever unit, and includes a welding head facing the clamping frame unit. The clamping device is connected to the movable seat and has a clamping space. The ultrasonic positioning device is inserted into the clamping space and is clamped by the clamping device.

10 Claims, 11 Drawing Sheets

(51) Int. Cl.
*D05B 19/12* (2006.01)
*D05B 17/00* (2006.01)

(56) References Cited

U.S. PATENT DOCUMENTS

| | | | |
|---|---|---|---|
| 9,145,632 B2* | 9/2015 | Matsushima | D05B 19/12 |
| 9,228,279 B2* | 1/2016 | Abe | D05B 19/08 |
| 9,315,932 B2* | 4/2016 | Abe | D05B 19/12 |
| 2013/0131854 A1* | 5/2013 | Regan | A43D 119/00 |
| | | | 700/114 |
| 2014/0000498 A1* | 1/2014 | Yamanashi | D05C 5/02 |
| | | | 112/102.5 |
| 2017/0099909 A1* | 4/2017 | Lee | A43B 23/0295 |
| 2017/0347753 A1* | 12/2017 | Kilgore | A43D 8/26 |
| 2018/0125155 A1* | 5/2018 | Kirupanantham | B29C 65/1432 |
| 2018/0355531 A1* | 12/2018 | Blenis, Jr. | D05B 21/00 |
| 2018/0357740 A1* | 12/2018 | Blenis, Jr. | G03B 21/12 |
| 2019/0376216 A1* | 12/2019 | Blenis, Jr. | G01B 11/24 |
| 2019/0376218 A1* | 12/2019 | Huang | D05B 19/12 |
| 2019/0377318 A1* | 12/2019 | Blenis, Jr. | G05B 19/31 |

FOREIGN PATENT DOCUMENTS

| | | |
|---|---|---|
| JP | 2008180509 A | 8/2008 |
| JP | 2011126534 A | 6/2011 |
| TW | I589245 B | 7/2017 |
| TW | M566499 U | 9/2018 |

OTHER PUBLICATIONS

The Office Action issued to Japanese counterpart application No. 2019-86843 by the Japan Patent Office dated Jun. 16, 2020.

* cited by examiner

SHOEMAKING MACHINE HAVING ULTRASONIC POSITIONING FUNCTION

CROSS-REFERENCE TO RELATED APPLICATION

This application claims priority to Taiwanese Patent Application Nos. 107207793 and 108104056, filed on Jun. 11, 2018 and Feb. 1, 2019, respectively.

FIELD

The disclosure relates to a shoemaking equipment, more particularly to a shoemaking machine having an ultrasonic positioning function.

BACKGROUND

Generally, an upper is usually made by sewing through a computer-controlled sewing machine or hotpressing at least two components. If at least two components are directly hotpressed, relative displacement between the two components easily occurs, thereby resulting in misalignment of the connected positions. Therefore, it is usually necessary to pre-weld the two components by a spot welder to thereby form a pre-positioning effect.

When using the spot welder for spot welding the two components, manual work is still required, and the labor time is long, so that the production capacity cannot be effectively improved. Simultaneously, during the spot welding and pre-positioning operation, apart from the spot welder needs to be manually operated, the computer-controlled sewing machine is in an idle position as well, thereby affecting the cost and efficiency thereof.

SUMMARY

Therefore, an object of the present disclosure is to provide a shoemaking machine having an ultrasonic positioning function that can alleviate at least one of the drawbacks of the prior art.

Accordingly, a shoemaking machine having an ultrasonic positioning function of this disclosure includes a sewing device, a driving device, an ultrasonic positioning device and a clamping device. The sewing device includes a cantilever unit, a work platform, a clamping frame unit disposed on the work platform, and a drive unit for driving movement of the clamping frame unit. The work platform, the clamping frame unit and the cantilever unit are arranged in order in a bottom to top fashion along a vertical direction. The cantilever unit has a sewing needle extending toward the clamping frame unit. The driving device is disposed on the cantilever unit, and includes a movable seat that is movable toward and away from the clamping frame unit. The ultrasonic positioning device is connected to the cantilever unit, and includes a welding head which faces the clamping frame unit. The clamping device is connected to the movable seat and has a clamping space. The ultrasonic positioning device is inserted into the clamping space and is clamped by the clamping device.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
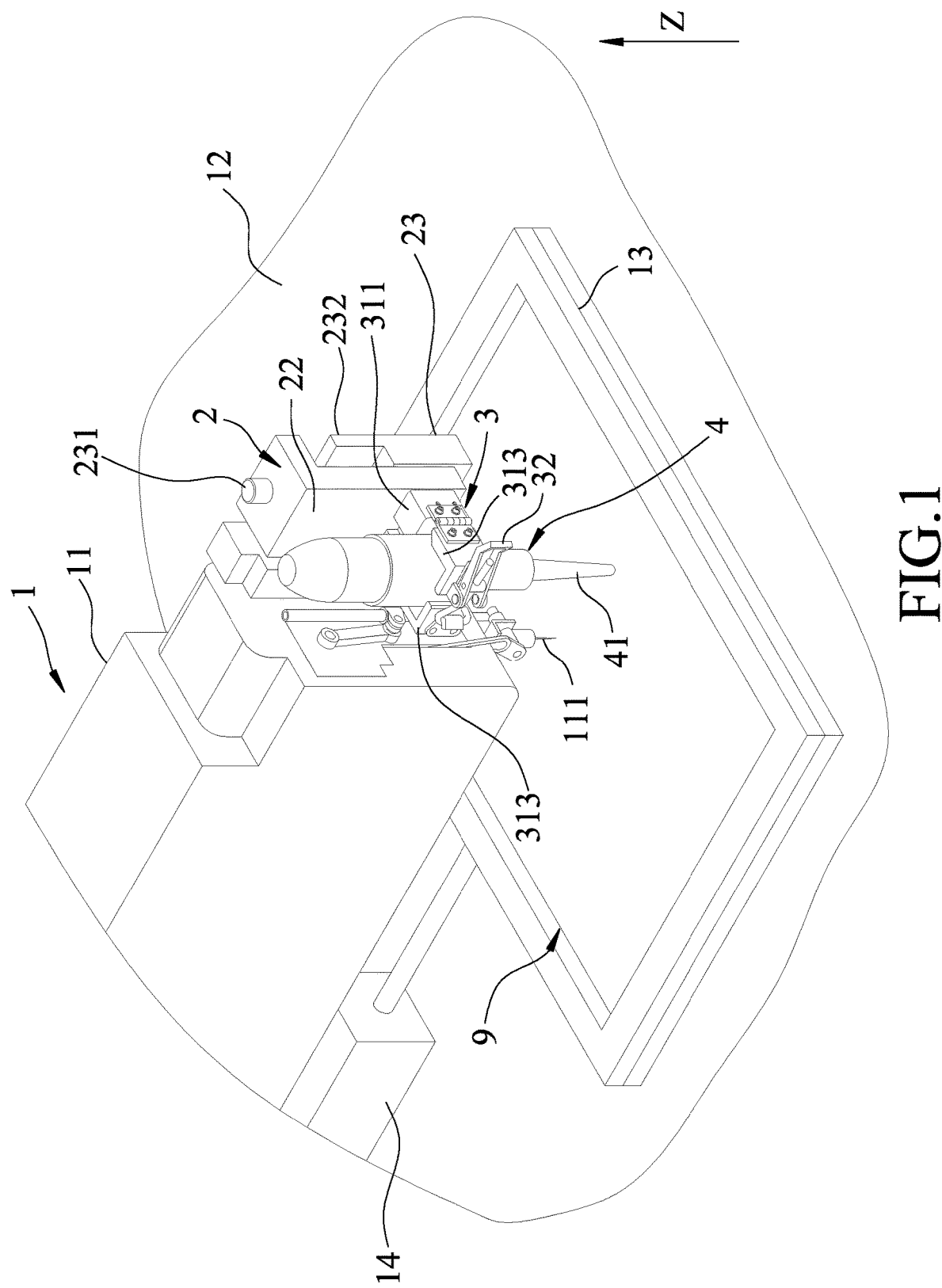
FIG. 1 is a fragmentary perspective view of a shoemaking machine according to the present disclosure.

Before the present disclosure is described in greater detail, it should be noted herein that like elements are denoted by the same reference numerals throughout the disclosure.

Figure 2:
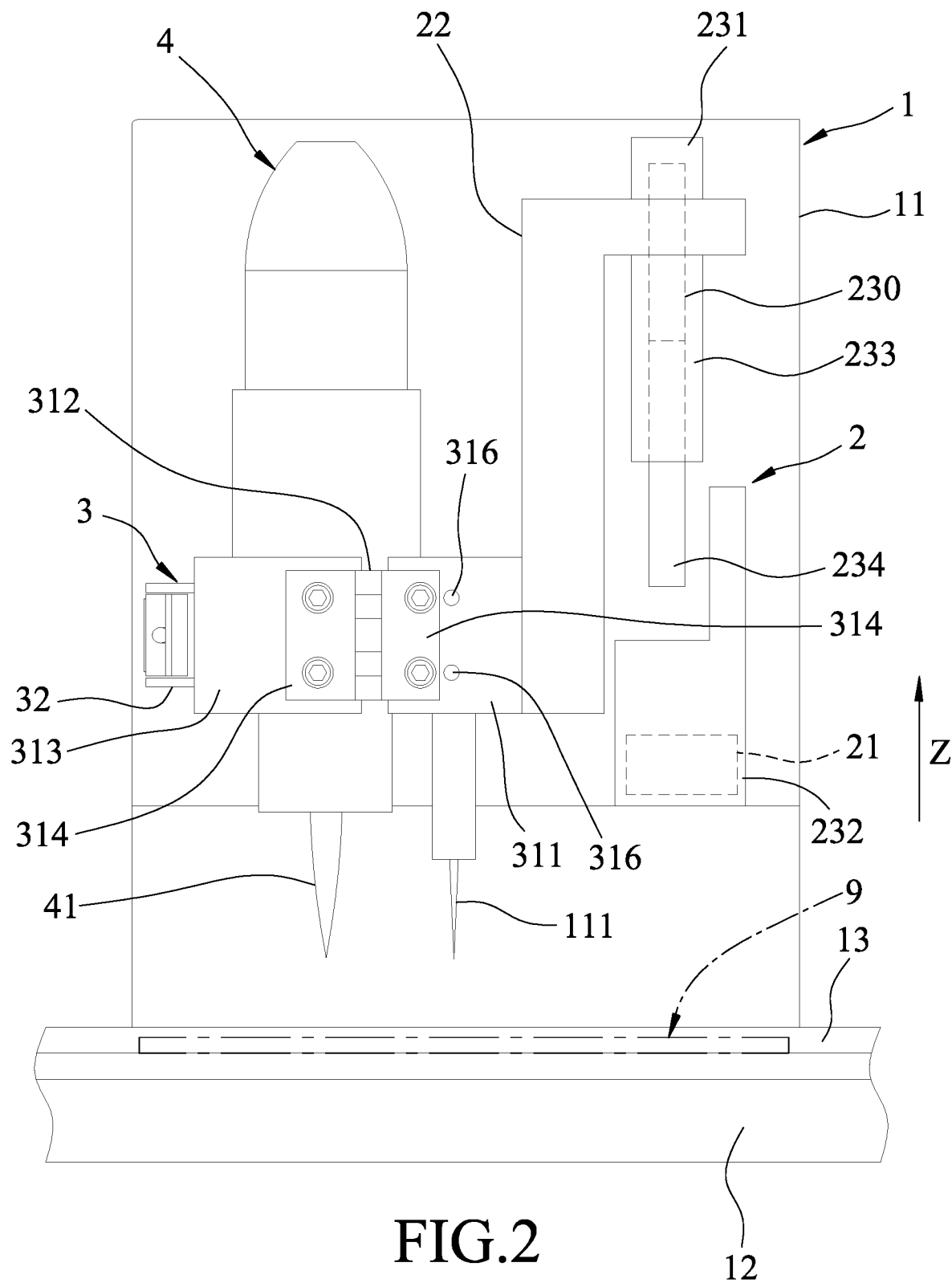
FIG. 2 is a schematic side view of FIG. 1, illustrating an ultrasonic positioning device of the shoemaking machine of this disclosure in a standby position.
Figure 3:
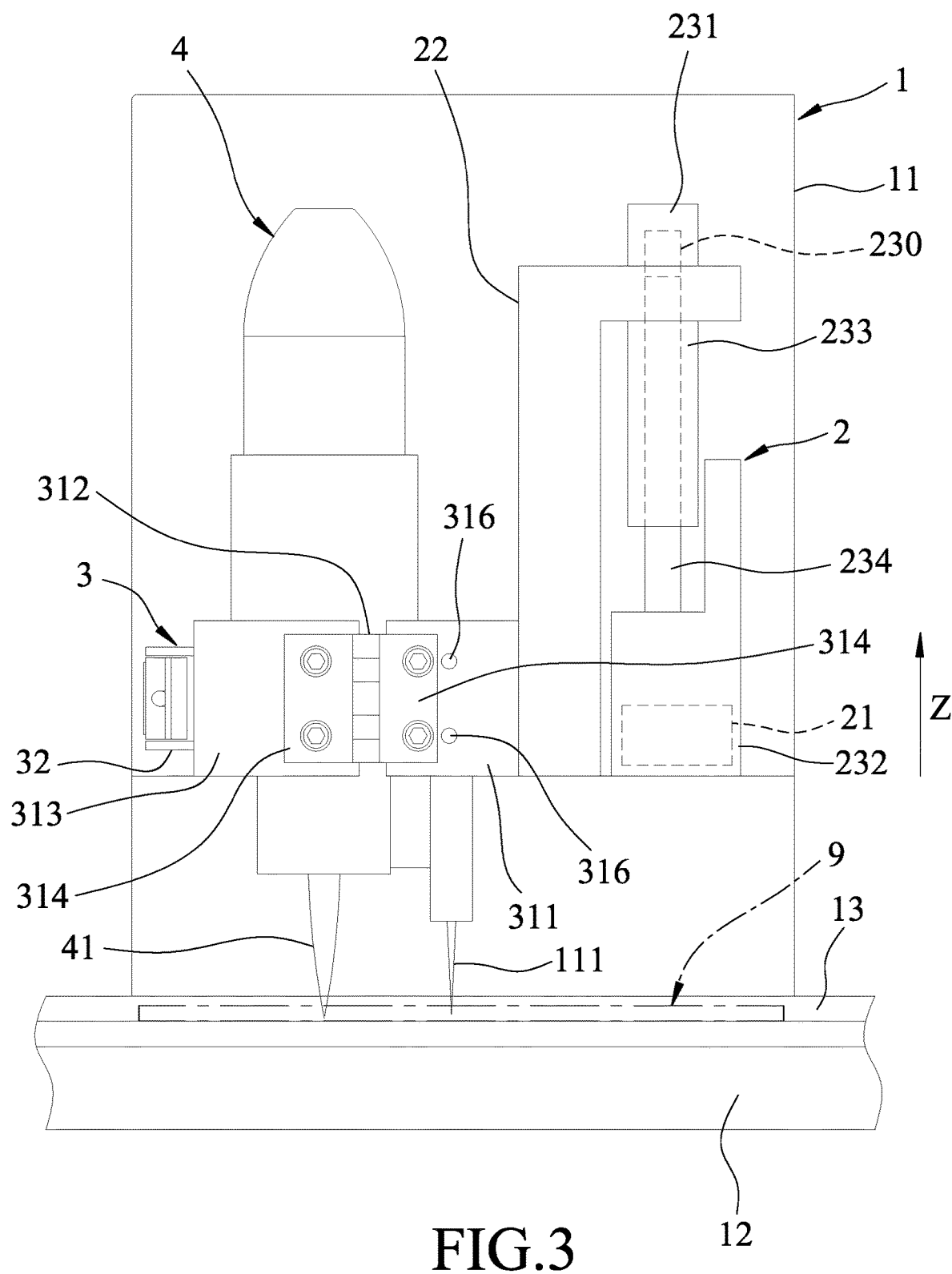
FIG. 3 is a view similar to FIG. 2, but illustrating the ultrasonic positioning device in a spot welding position.

Referring to FIGS. 1 to 3, a shoemaking machine of the present disclosure has an ultrasonic positioning function, and comprises a sewing or stitching device 1, a driving device 2, a clamping device 3 and an ultrasonic positioning device 4.

The sewing device 1 includes a cantilever unit 11, a work platform 12, a clamping frame unit 13, and a drive unit 14. The work platform 12, the clamping frame unit 13 and the cantilever unit 11 are arranged in order in a bottom to top fashion along a vertical direction (Z). The cantilever unit 11 has a sewing needle 111 extending toward the clamping frame unit 13. The clamping frame unit 13 is configured to clamp at least two shoe materials 9 that are stacked one on top of the other. The shoe materials 9 may be components for making an upper of a shoe. The drive unit 14 is a motor, and is provided for driving movement of the clamping frame unit 13. When the clamping frame unit 13 is driven by the drive unit 14 to move forward and backward or leftward and rightward, the sewing needle 111 can sew together the shoe materials 9 clamped by the clamping frame unit 13.

The driving device 2 is disposed on the cantilever unit 11, and includes a lifting drive 21, a movable seat 22 and a speed reduction unit 23.

The lifting drive 21 is disposed on the cantilever unit 11, and is exemplified as a cylinder in this embodiment. In other embodiment, the lifting drive 21 may be a coordination of a motor and a screw or other similar elements which can make reciprocating movement.

The movable seat 22 is connected to the lifting drive 21, so that the lifting drive 21 can drive the movable seat 22 to move toward and away from the clamping frame unit 13. It is worth noting that the movable seat 22 may also be manually operated.

The speed reduction unit 23 includes a pressure cylinder 231 and a fixed seat 232. The pressure cylinder 231 has a cylinder body 233 and a piston rod 234. The cylinder body 233 is connected to the movable seat 22, and defines a buffer chamber 230. The piston rod 234 is retractably disposed in the buffer chamber 230 along the vertical direction (Z). The fixed seat 232 is connected to the cantilever unit 11. The piston rod 234 is squeezed by the fixed seat 232 to retract into the cylinder body 233 when it is in contact with the fixed seat 232 to compress the volume of the buffer chamber 230 and to generate a resistance for deceleration of the movable seat 22 when the movable seat 22 moves toward the clamping frame unit 13. In this embodiment, the piston rod 234 is removably in contact with the fixed seat 232. However, in other embodiments, the piston rod 234 may resiliently abut against the fixed seat 232.

Figure 4:
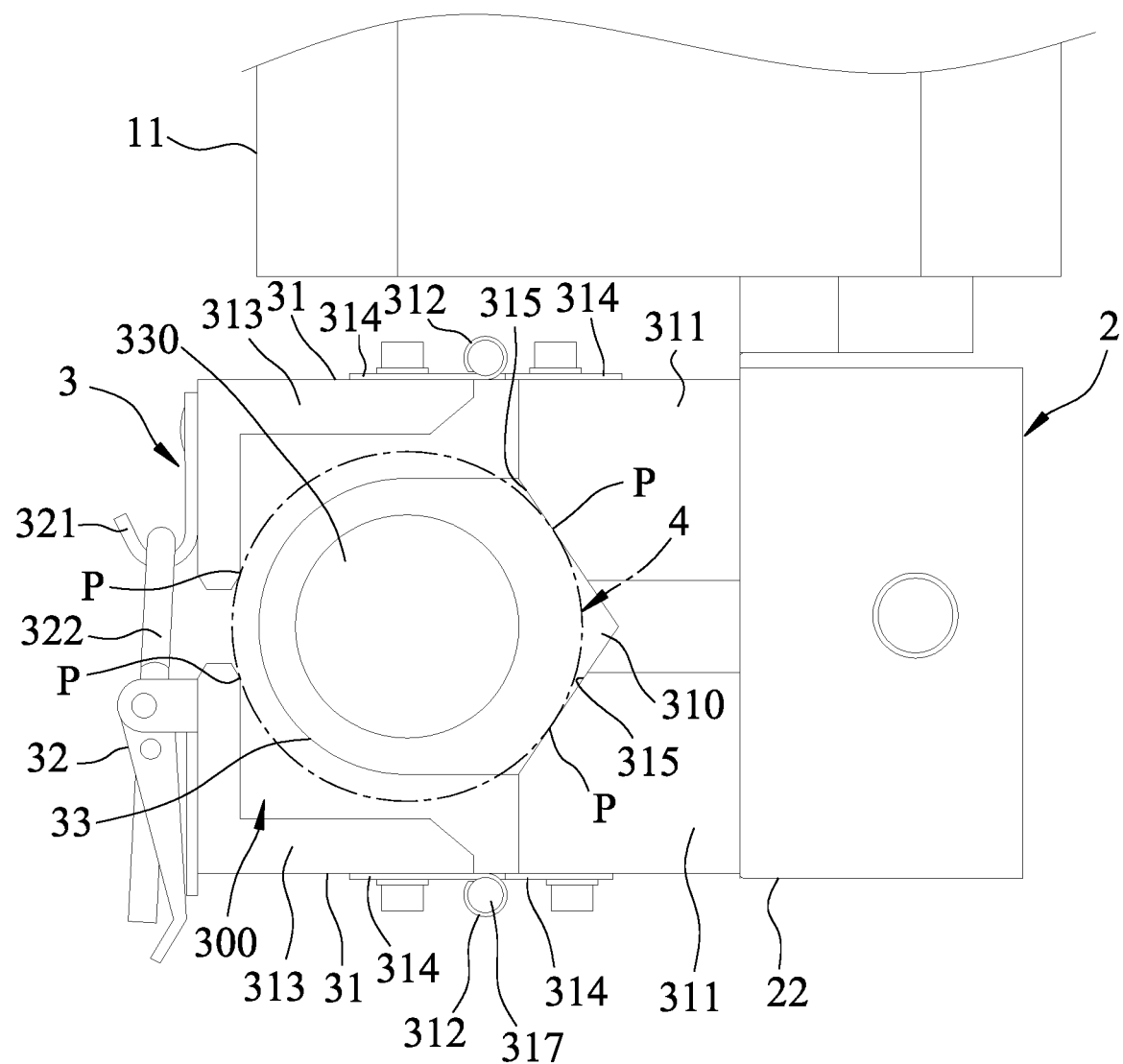
FIG. 4 is a fragmentary top view of the shoemaking machine of this disclosure.

Referring to FIG. 4, in combination with FIGS. 1 and 2, the clamping device 3 includes a pair of clamping seats 31 connected to the movable seat 22, and a latch 32 connected to and locking together the clamping seats 31. The latch 32 and the clamping seats 31 cooperatively define a clamping space 300. Each clamping seat 31 includes a connecting member 311, a hinge 312, and a clamping plate 313.

The connecting member 311 is connected to the movable seat 22, and has an inclined abutment surface 315 extending inwardly toward the movable seat 22. Preferably, the connecting members 311 of the clamping seats 31 are integrally connected as one piece, and the inclined abutment surfaces 315 of the connecting members 311 cooperatively define a V-shaped groove 310 therebetween. The groove 310 communicates with the clamping space 300. In this embodiment, the connecting member 311 of each clamping seat 31 has a plurality of pairs of locking holes 316 spaced apart from and parallel to each other along a direction transverse to the vertical direction (Z). Two locking holes 316 of each pair are spaced apart from each other along the vertical direction (Z).

The hinge 312 includes two hinge plates 314, and a hinge pin 317 (see FIG. 4) interconnecting the hinge plates 314 such that the hinge plates 314 can pivot relative to each other. One of the hinge plates 314 is fixed to the clamping plate 313. The other hinge plate 314 is connected to a selected pair of the locking holes 316. The distance between the connecting member 311 and the clamping plate 313 may be adjusted using different sizes of the hinges 312 so as to enlarge or reduce the clamping space 300.

The clamping plate 313 has a substantially L-shaped configuration. The clamping plates 313 and the inclined abutment surfaces 315 of the clamping seats 31 cooperatively surround the clamping space 300.

The latch 32 includes a latching member 321 disposed on the clamping plate 313 of one of the clamping seats 31, and a latching ring 322 disposed on the clamping plate 313 of the other clamping seat 31 and detachably engaged with the latching member 321. The clamping plates 313 of the clamping seats 31 are fixed when the latching ring 322 is engaged with the latching member 321.

The clamping device 3 further includes a positioning plate 33 detachably connected to the connecting member 311 and extending into the clamping space 300 toward the clamping plate 313. The positioning plate 33 has a mounting hole 330 extending therethrough along the vertical direction (Z).

The ultrasonic positioning device 4 is disposed on the clamping device 3. Specifically, the is inserted into the clamping space 300 with the welding head 41 thereof extending through the mounting hole 330 in the positioning plate 33, and is then clamped by the clamping seats 31 by engaging the latching 322 with the latching member 321. At this time, a lower portion of the ultrasonic positioning device 4, which is proximate to the welding head 41, is supported by the positioning plate 33. When the lifting drive 21 is activated and drives the movable seat 22 to move toward and away from the clamping frame unit 13, the movable seat 22, in turn, drives the ultrasonic positioning device 4 to move between a standby position and a spot welding position relative to the clamping frame unit 13 along the vertical direction (Z). When the ultrasonic positioning device 4 is in the standby position, as shown in FIG. 2, the movable seat 22 is disposed away from the clamping frame unit 13; and, when the ultrasonic positioning device 4 is in the spot welding position, as shown in FIG. 3, the movable seat 22 is proximate to the clamping frame unit 13. The ultrasonic positioning device 4 includes a welding head 41 which faces the clamping frame unit 13. The welding head 41 is located lower than a bottom end of the sewing needle 111 when the ultrasonic positioning device 4 is in the spot welding position.

When the ultrasonic positioning device 4 is inserted into the clamping space 300 and is clamped by the clamping seats 31, it forms at least three abutment points (P) with the clamping seats 31. Through these abutment points (P), the ultrasonic positioning device 4 can be positioned to the clamping device 3. In this embodiment, the ultrasonic positioning device 4 has an outer peripheral surface abuttingly contacting with the inclined abutment surfaces 315 of the connecting members 311 and the clamping plates 313 of the clamping seats 31 to form four abutment points (P), so that the ultrasonic positioning device 4 is firmly clamped and positioned by the clamping device 3. Thus, with the ultrasonic positioning device 4 being clamped by the clamping seats 31 and with the lower portion thereof being held and supported by the positioning plate 33, movement of the ultrasonic positioning device 4 along the vertical direction (Z) can be prevented.

It should be particularly noted herein that since the size of the clamping space 300 of the clamping device 3 can be adjusted, the clamping device 3 can be applied to different specifications or sizes of ultrasonic positioning devices 4.

During installation of the ultrasonic positioning device 4, the latching ring 322 is first disengaged from the latching member 321, after which the ultrasonic positioning device 4 is inserted into the mounting hole 330 so as to be supported by the positioning plate 33, and stands upright between the two clamping seats 31. The latching ring 322 is then engaged with the latching member 321, and simultaneously, the clamping plates 313 of the clamping seats 31 push the ultrasonic positioning device 4 to abut against the inclined abutment surfaces 315 of the connecting members 311, thereby fixedly positioning the ultrasonic positioning device 4 on the clamping device 3. At this time, the ultrasonic positioning device 4 can start to carryout the spot welding process.

After the ultrasonic positioning device 4 is installed, the welding head 41 thereof is located lower than the bottom end of the needle 111, and the spot welding can be performed. After the spot welding is completed, the latching ring 322 is disengaged from the latching member 321 to permit removal of the ultrasonic positioning device 4 from the clamping space 300, and the sewing device 1 can be activated to perform a sewing operation. Alternatively, after the spot welding is completed, the ultrasonic positioning device 4 can be driven by the movable seat 22 or manually to move to the standby position so as to locate the welding head 41 thereof at a position higher than that of the bottom end of the needle 111, so that the sewing operation of the sewing device 1 can be carried out. That is, as long as the position of the welding head 41 can be moved relative to the needle 111, the spot welding process and the sewing operation can be alternately switched using this disclosure.

Figure 5:
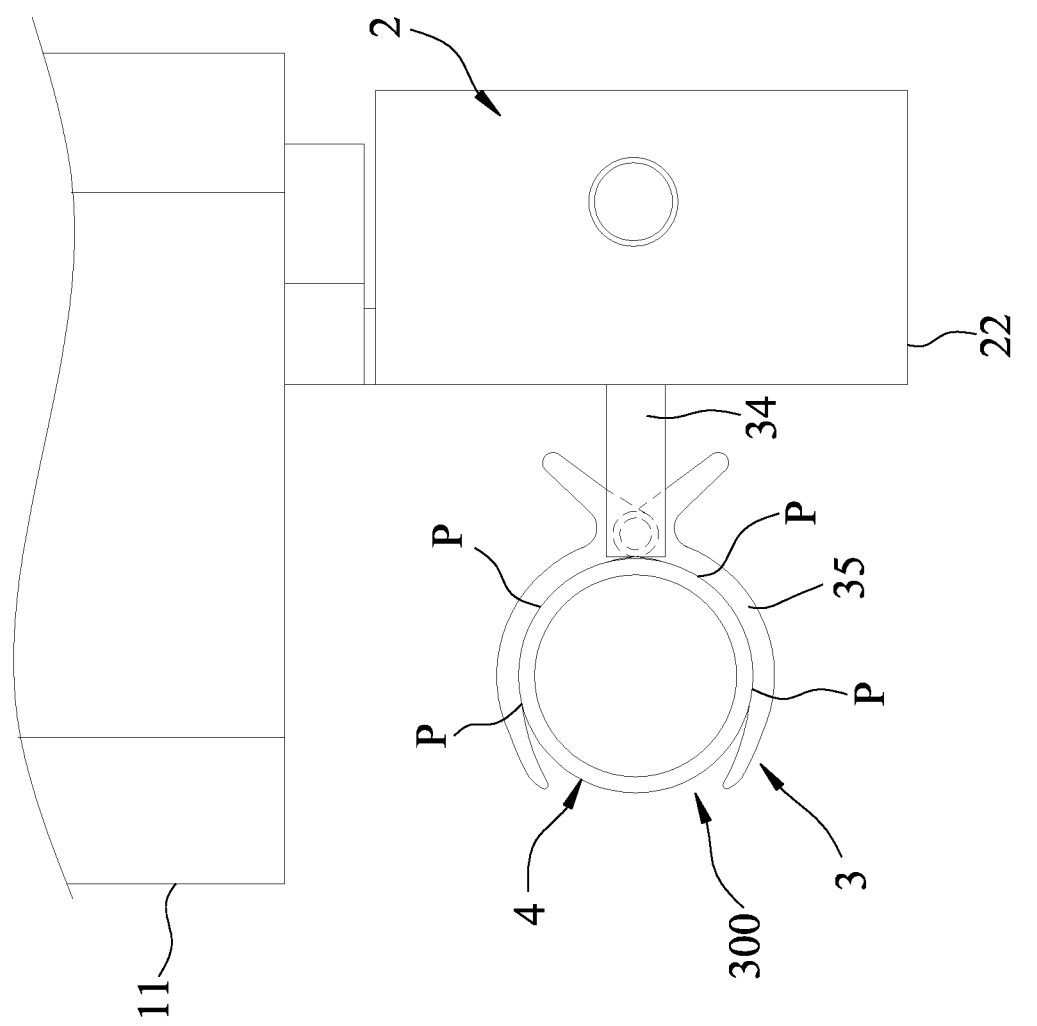
FIG. 5 is a view similar to FIG. 4, but illustrating an alternative form of a clamping device of the shoemaking machine of this disclosure.
Figure 6:
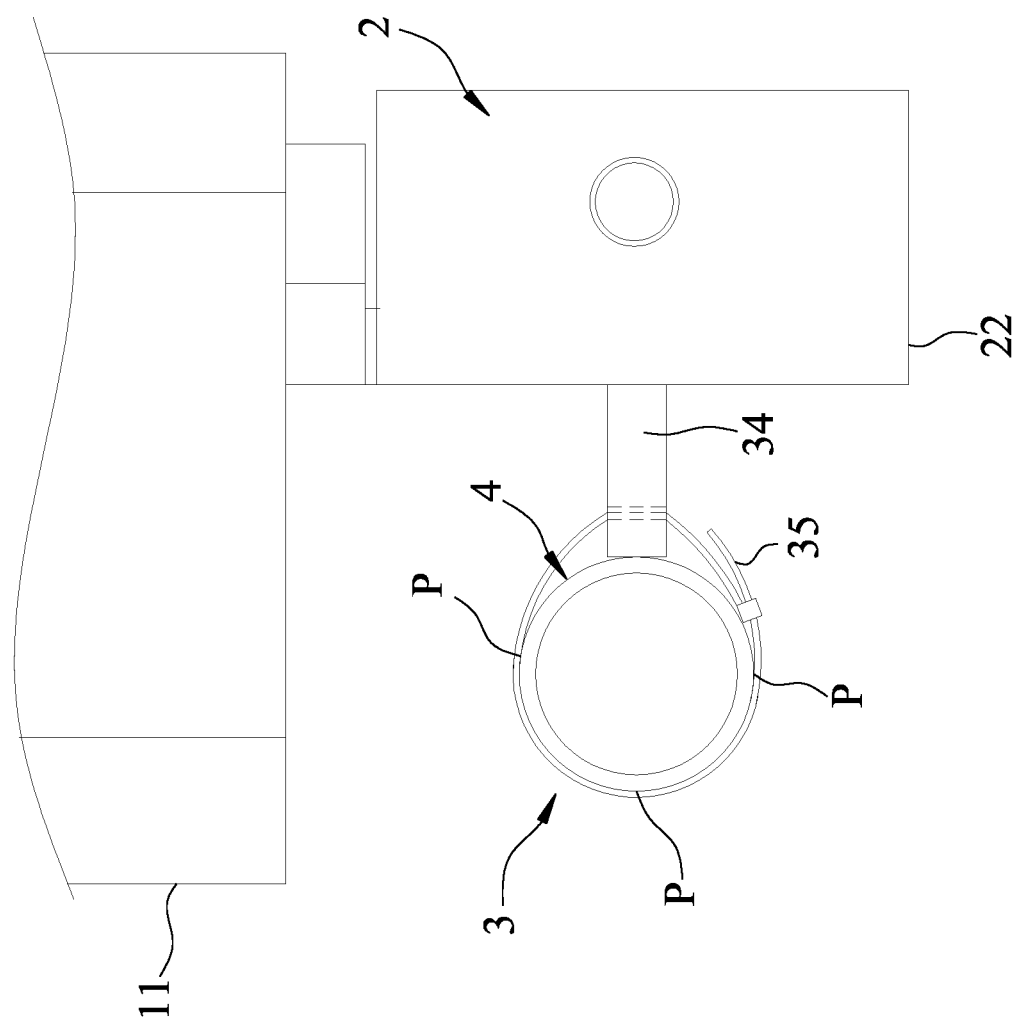
FIG. 6 illustrates another alternative form of the clamping device of the shoemaking machine of this disclosure.
Figure 7:
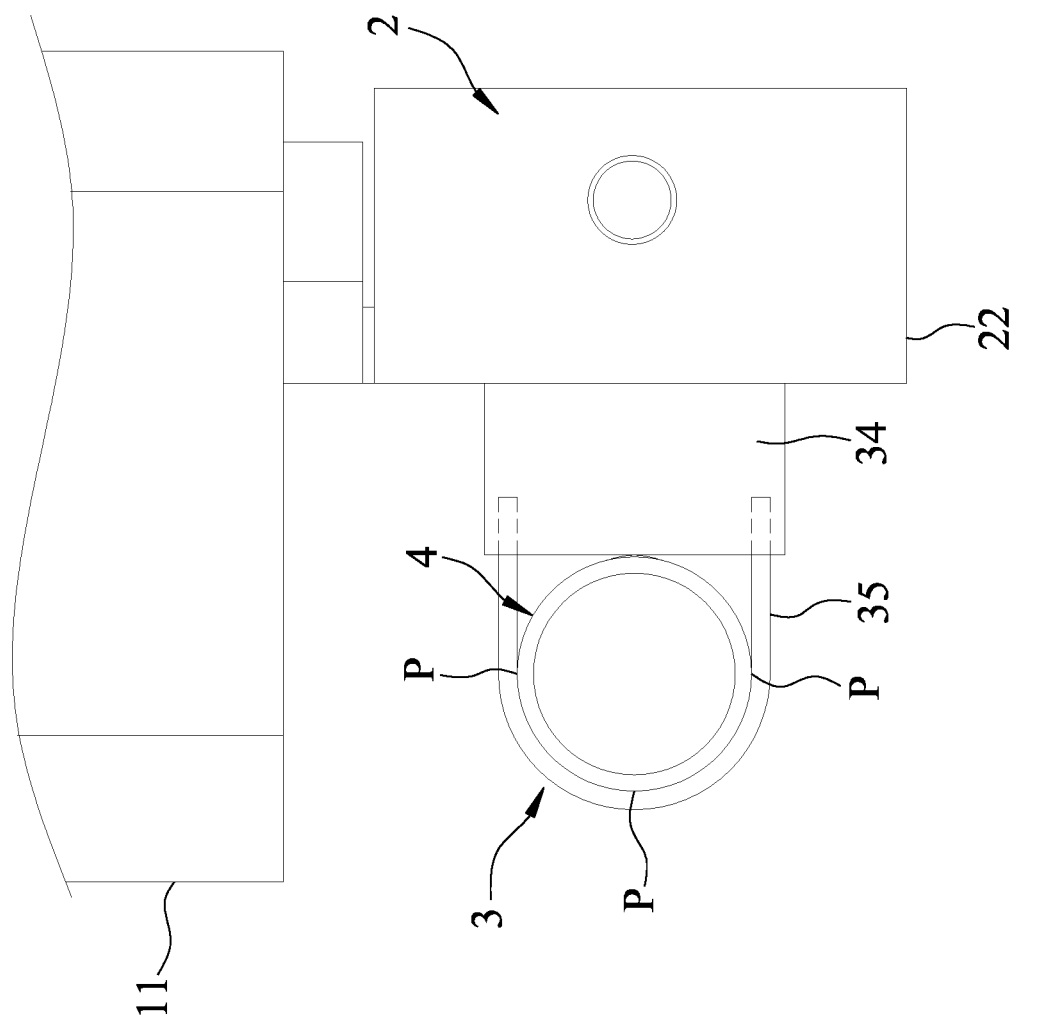
FIG. 7 illustrates yet another alternative form of the clamping device of the shoemaking machine of this disclosure.

It should be noted herein that, in other embodiments, the clamping device 3 may only include a fixed member 34 and a clamping member 35, as shown in FIGS. 5 to 7. The fixed member 34 is connected to the movable seat 22. The clamping member 35 is disposed on the fixed member 34, and defines the clamping space 300. The ultrasonic positioning device 4 forms the abutment points (P) with the clamping member 35. The clamping member 35 may be an elastic clamp (see FIG. 5), a binding strap (see FIG. 6), or a tubular binder (see FIG. 7), as long as it can have the function of positioning the ultrasonic positioning device 4.

To perform spot welding, the lifting drive 21 is activated to drive the movable seat 22 to move toward the clamping frame unit 13, and the movable seat 22, in turn, drives the ultrasonic positioning device 4 to descend to the spot welding position, so that the welding head 41 of the ultrasonic positioning device 4 is located lower than the bottom end of the needle 111 and the spot welding can be performed. During this time, the piston rod 234 connected to the movable seat 22 contacts the fixed seat 232 and is forced by the fixed seat 232 to squeeze and compress the volume of the buffer chamber 230 so as to generate a resistance against the movable seat 22. As such, when the movable seat 22 is lowered toward the clamping frame unit 13 and the ultrasonic positioning device 4 is moved to the spot welding position, the movable seat 22 can be decelerated, thereby preventing the welding head 41 of the ultrasonic positioning device 4 from damaging the shoe materials 9 due to excessive pressure exerted thereto. Moreover, since the lifting drive 21 drives the movable seat 22 at a consistent speed each time and the magnitude of resistance received from the pressure cylinder 231 is uniform each time, the strength and time of each spot welding are consistent, so that the manufacturing efficiency and yield are increased.

With the clamping frame unit 13 of the sewing device 1 being movable relative to the work platform 12 and in coordination with the ultrasonic positioning device 4, the automation of the spot welding process of this embodiment can be realized without requiring manual operation.

Figure 8:
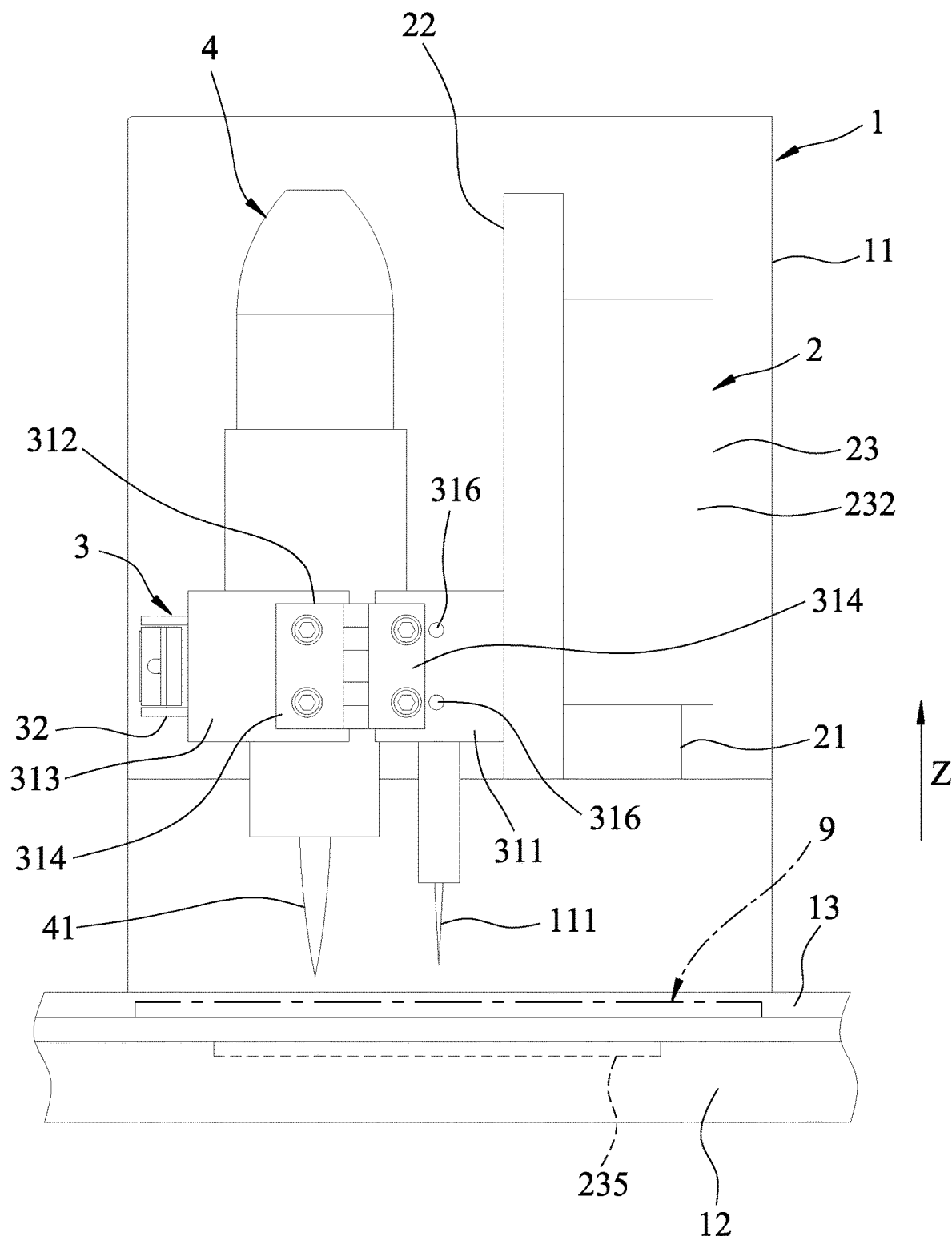
FIG. 8 illustrates an alternative form of a speed reduction unit of the shoemaking machine of this disclosure.
Figure 9:
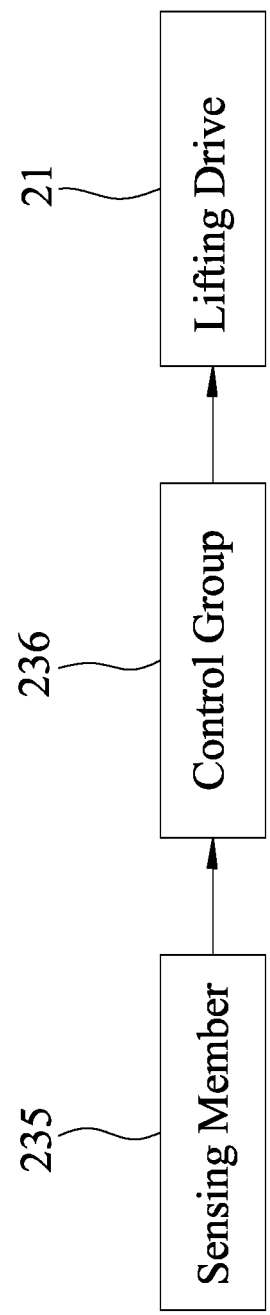
FIG. 9 is a block diagram of the driving device of FIG. 8.

FIGS. 8 and 9 illustrate an alternative form of the speed reduction unit 23 of this disclosure. In this case, the speed reduction unit 23 includes the fixed seat 232, a sensing member 235 and a control group 236. The sensing member 235 is disposed on the work platform 12, and is used for measuring a pressure value of the welding head 41 of the ultrasonic positioning device 4 when the welding head 41 is in contact with the work platform 12. The control group 236 is electrically connected to the sensing member 235 and the lifting drive 21, and is used to receive the pressure value measured by the sensing member 235, and stores at least one predetermined value and a maximum predetermined value. The at least one predetermined value is lower than the maximum predetermined value. When the pressure value measured by the sensing member 235 is greater than or equal to the at least one predetermined value, the control group 236 controls the lifting drive 21 to decelerate; and, when the pressure value measured by the sensing member 235 is greater than or equal to the maximum predetermined value, the control group 236 controls the lifting drive 21 to stop operation. Through this, the speed of the movable seat 22 can be controlled in multiple stages, so that, when the movable seat 22 is lowered toward the clamping frame unit 13 and the ultrasonic positioning device 4 is moved to the spot welding position, the movable seat 22 can be decelerated, thereby preventing the welding head 41 of the ultrasonic positioning device 4 from damaging the shoe materials 9 due to excessive pressure exerted thereto.

For example, the lifting drive 21 is a direct current motor, and the control group 236 can output a specific voltage corresponding to each predetermined value. When the sensing member 235 detects a different pressure value, the control group 236 can control the rotational speed of the lifting drive 21, so that the movable seat 22 can decelerate in different degrees.

It is worth noting that the control group 236 may also control the speed at which the lifting drive 21 drives the movable seat 22 to move toward the clamping frame unit 13 and the time at which the movable seat 22 stays at a position proximate to the clamping frame unit 13. By adjusting the speed of movement of the movable seat 22, the efficiency and quality of manufacturing the shoe can be increased, and the spot welding time of the ultrasonic positioning device 4 can be adjusted according to the characteristics of different materials. Furthermore, the predetermined value can also be set according to the characteristics of different materials, and the present disclosure can be applied to the shoe materials 9 having different material characteristics.

Figure 10:
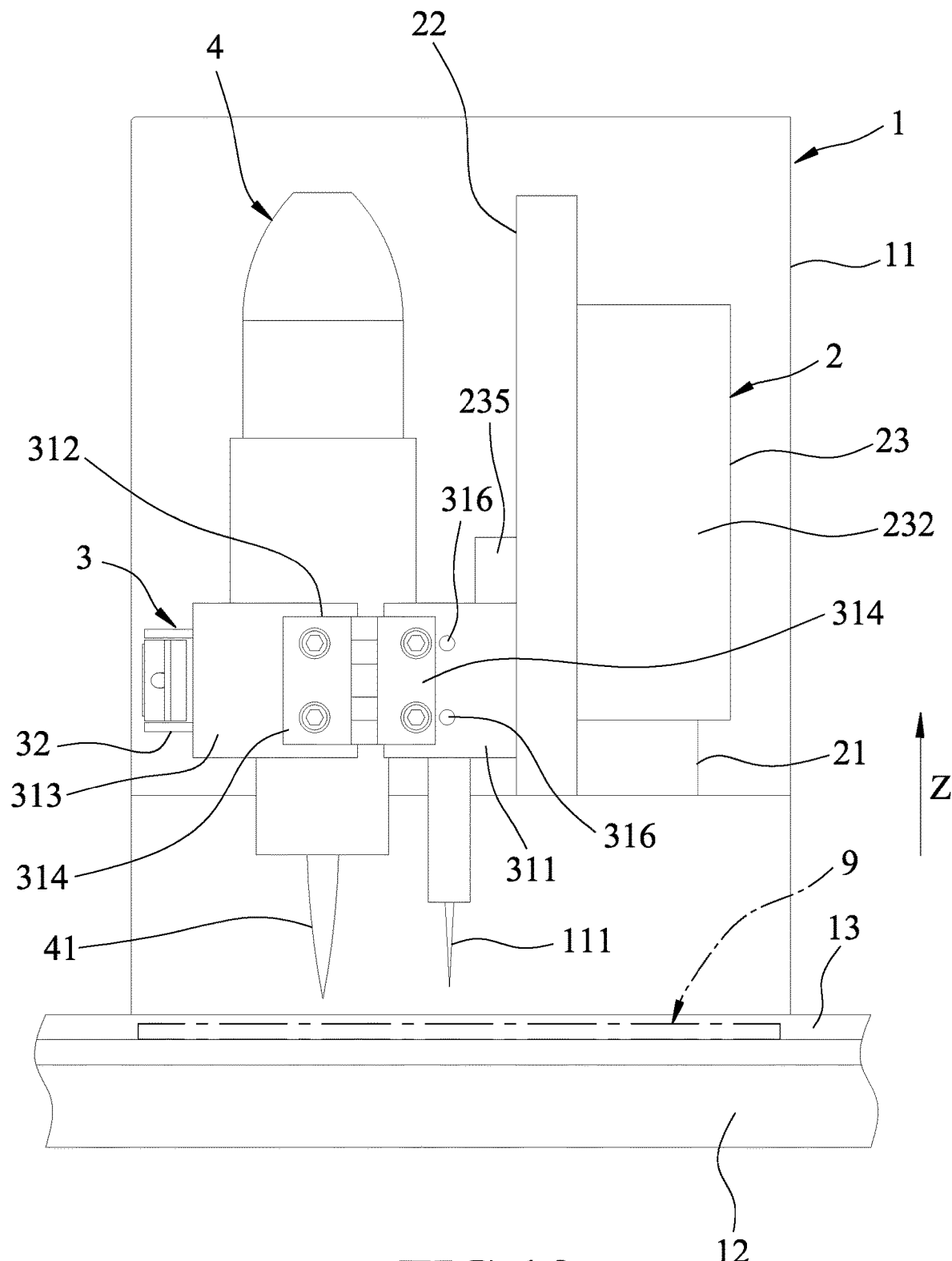
FIG. 10 illustrates another alternative form of the speed reduction unit of the shoemaking machine of this disclosure.
Figure 11:
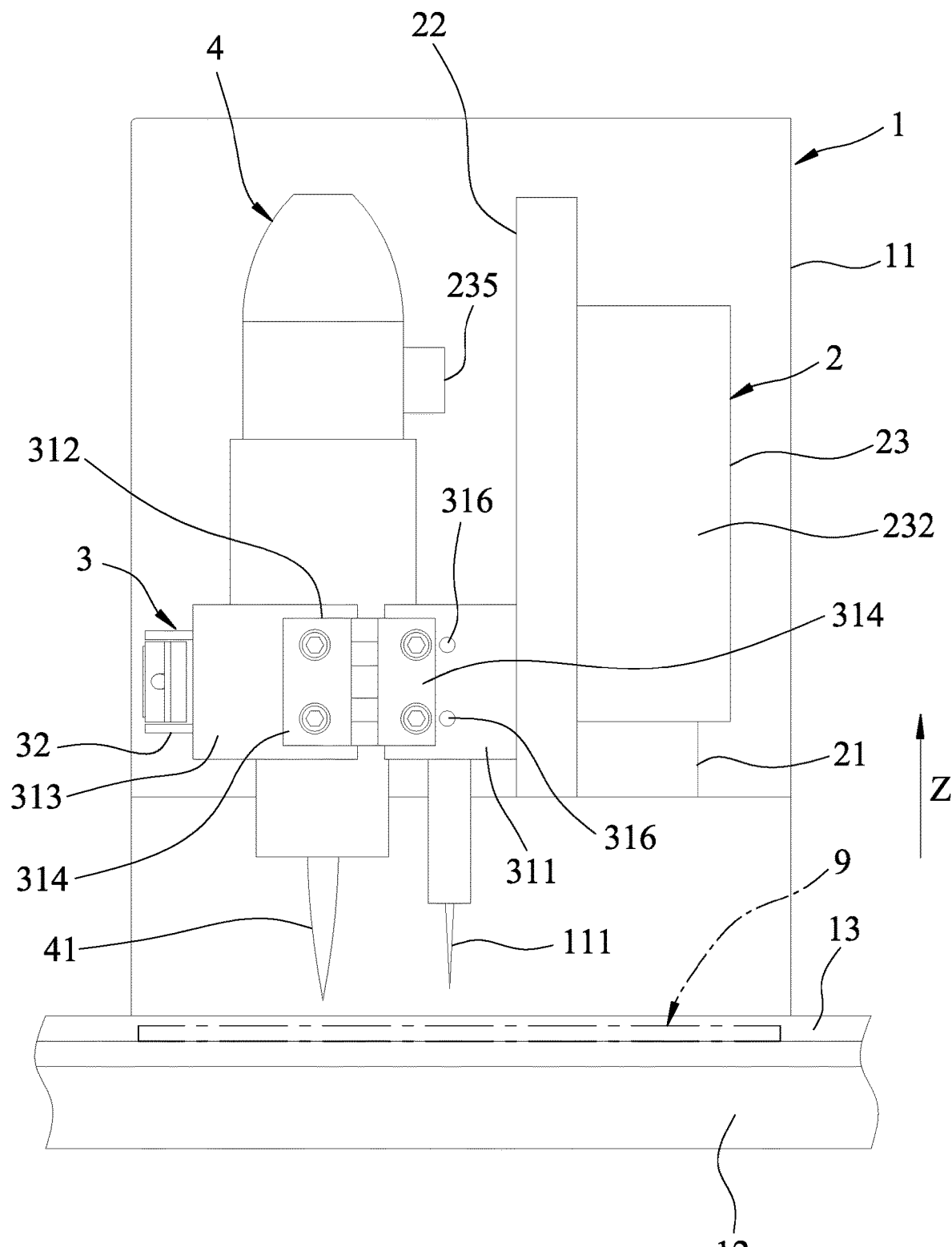
FIG. 11 illustrates yet another alternative form of the speed reduction unit of the shoemaking machine of this disclosure.

In other embodiments, the speed reduction unit 23 may be disposed on the movable seat 22, as shown in FIG. 10, or on the ultrasonic positioning device 4, as shown in FIG. 11, and may be used for measuring a pressure value caused by a reaction force generated by the welding head 41 of the ultrasonic positioning device 4 when in contact with the work platform 12.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A shoemaking machine having an ultrasonic positioning function, comprising:

a sewing device including a cantilever unit, a work platform, a clamping frame unit disposed on said work platform, and a drive unit for driving movement of said clamping frame unit, wherein said work platform, said clamping frame unit and said cantilever unit are arranged in order in a bottom to top fashion along a vertical direction, said cantilever unit having a sewing needle extending toward said clamping frame unit;

a driving device disposed on said cantilever unit and including a movable seat that is movable toward and away from said clamping frame unit;

an ultrasonic positioning device connected to said cantilever unit and including a welding head which faces said clamping frame unit; and a clamping device connected to said movable seat and having a clamping space;

wherein said ultrasonic positioning device is inserted into said clamping space and is clamped by said clamping device; and wherein said driving device further includes a lifting drive for driving said movable seat to move toward and away from said clamping frame unit, and wherein, when said lifting drive drives said movable seat to move toward and away from said clamping frame unit, said movable seat, in turn, drives said ultrasonic positioning device to move between a standby position and a spot welding position relative to said clamping frame unit, said movable seat being disposed away from said clamping frame unit when said ultrasonic positioning device is in said standby position, and being proximate to said clamping frame unit when said ultrasonic positioning device is in said spot welding position.

2. The shoemaking machine as claimed in claim 1, wherein said clamping device includes a pair of clamping seats disposed on said movable seat, and a latch connected to and locking together said clamping seats, said clamping seats and said latch cooperatively defining said clamping space.

3. The shoemaking machine as claimed in claim 2, wherein each of said clamping seats includes a connecting member connected to said movable seat, and a clamping plate pivoted to said connecting member, said latch including a latching member disposed on said clamping plate of one of said clamping seats, and a latching ring disposed on said clamping plate of the other one of said clamping seats and detachably engaged with said latching member, said ultrasonic positioning device being clamped by said clamping seats when said latching ring is engaged with said latching member.

4. The shoemaking machine as claimed in claim 3, wherein said connecting member of each of said clamping seats has an inclined abutment surface extending inwardly toward said movable seat, said ultrasonic positioning device abuttingly contacting with said inclined abutment surfaces of said connecting members.

5. The shoemaking machine as claimed in claim 3, wherein each of said clamping seats further has a hinge, said connecting member of each of said clamping seats having a plurality of pairs of locking holes spaced apart from and parallel to each other along a direction transverse to the vertical direction, said hinge including two hinge plates pivotally connected to each other, one of said hinge plates being connected to a selected pair of said locking holes of said connecting member, the other one of said hinge plates being connected to said clamping plate.

6. The shoemaking machine as claimed in claim 1, wherein said clamping device includes a fixed member connected to said movable seat, and a clamping member disposed on said fixed member and defining said clamping space, said clamping member being one of an elastic clamp, a binding strap and a tubular binder.

7. The shoemaking machine as claimed in claim 1, wherein said driving device further includes a speed reduction unit disposed on said sewing device for generating a resistance to decelerate said movable seat when said movable seat is driven by said lifting drive to move toward said clamping frame unit.

8. The shoemaking machine as claimed in claim 7, wherein said speed reduction unit includes a pressure cylinder and a fixed seat, said pressure cylinder having a cylinder body that is connected to said movable seat and that defines a buffer chamber, and a piston rod retractably disposed in said buffer chamber, said fixed seat being connected to said cantilever unit, said piston rod being squeezed by said fixed seat when in contact with said fixed seat to compress the volume of said buffer chamber and to generate a resistance for deceleration of said movable seat when said movable seat is driven to move toward said clamping frame unit.

9. The shoemaking machine as claimed in claim 7, wherein said speed reduction unit includes a sensing member and a control group, said sensing member being used for measuring a pressure value of said welding head of said ultrasonic positioning device when said welding head is in contact with said work platform, said sensing member being disposed on one of said ultrasonic positioning device, said work platform and said movable seat, said control group being electrically connected to said sensing member and said lifting drive, said control group being used to receive said pressure value measured by said sensing member and storing a maximum predetermined value, said control group controlling said lifting drive to stop operation when said pressure value measured by said sensing member is greater than or equal to said maximum predetermined value.

10. The shoemaking machine as claimed in claim 9, wherein said control group further stores at least one predetermined value, said at least one predetermined value being lower than said maximum predetermined value, said control group controlling said lifting drive to decelerate when the pressure value measured by said sensing member is greater than or equal to said at least one predetermined value.

* * * * *